Patented Nov. 14, 1922.

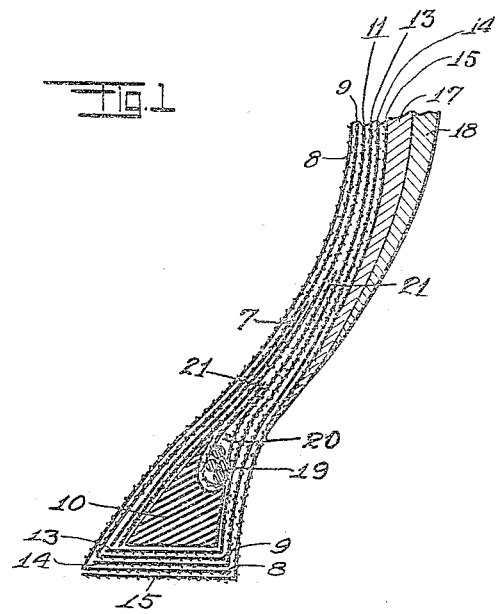
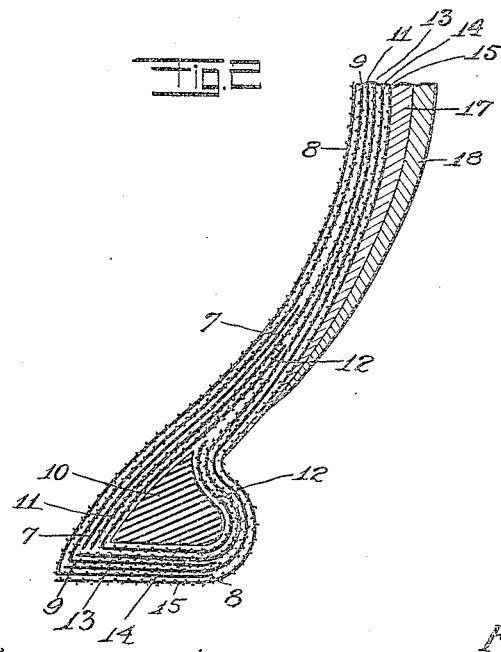

1,435,667

UNITED STATES PATENT OFFICE.

FREDERICK A. SCHULTZ, OF HASBROUCK HEIGHTS, NEW JERSEY.

VEHICLE TIRE SHOE.

Application filed April 30, 1920. Serial No. 377,766.

*To all whom it may concern:*

Be it known that I, FREDERICK A. SCHULTZ, a citizen of the United States, and a resident of Hasbrouck Heights, in the county of Bergen and State of New Jersey, have invented certain new and useful Improvements in Vehicle Tire Shoes, of which the following is a full, clear, and exact description.

Among the principal objects which the present invention has in view are: to reinforce structures of the character mentioned adjacent the supporting base thereof; to avoid the disarray of the threads of the woven fabric used in the construction of articles of the character indicated, and particularly adjacent the supporting edges of said articles; to increase the service period of the tire adjacent the bead or supporting base thereof; to improve the construction and arrangement for reinforcing or wiring the bead employed in straight-side tires; and to improve the construction of the said bead and side wall.

Drawings.

Figure 1 is a sectional view of a fragment of a tire shoe constructed and arranged in accordance with the present invention as applied to what is known as straight-side tires;

Figure 2 is a similar view showing the invention as applied to what is known as clincher tires.

Heretofore shoes of the character mentioned have been constructed employing so-called rubber coated cord fabric or fabric in which relatively strong cord is disposed in parallel relation and so held by relatively frail means. The fabric is disposed in the structure by being laid across and around the same, at an angle of approximately 45 degrees from the annular axis of the shoe.

In service the torque of the wheel pulls the thread of the shoe, and tends to open the rubber coated cord fabric adjacent the bead or base of the shoe. It is with particular reference to avoid this action that I reinforce the shoe adjacent the beads thereof by annular non-stretchable strips 7. The strips 7 are preferably molded or made to the desired shape and may be constructed of metal fibre, leather, or properly arranged fabric, which will not stretch lengthwise, or in the direction of extension of the bead of the shoe.

The fabric is placed on the mold and made thereover in the usual method. After the inner layers 8 and 9 have been set, the strips 7 are adjusted; over the strips 7 is placed the layer 11, and over the layer 11 are set the beads 10. The beads 10 when constructed in accordance with the present invention are formed of raw rubber, which is covered with a tire fabric 12, of the usual weave, around the raw bead one end to be one-third up side wall and other two-thirds up side wall, where the woof and warp threads are of approximately equal strength, and are interwoven upon one another. The bead 10 and its covering 12 is molded to the suitable shape prior to setting. The said beads having been set, the outer layers 13, 14 and 15 are set and knitted in the manner usual in constructions of this nature. Under the beads 10, and to form the heel or base of the shoe, the layers 13, 9, 14, 8 and 15 or more turned under the beads and folded upon one another in the order named.

When the fabric body of the shoe is built up to the required thickness, the rubber or composition layers 17 and 18 are spread or set over the shoe, to form the tread thereof, when transferred from the mold or core to the curing mold, to be vulcanized or cured.

When manufacturing the straight-side shoe, as shown in Figure 1 of the drawings, the non-stretching wires 19 are retained within and covered by a bag-like structure 20, the free and lapped edges 21 thereof are inserted between the fabric layers removed from the bead 10.

This structure, while adding to the strength of the shoe, serves also as an independent wearing surface for the convolutions of the wire 19, thus avoiding wear which might otherwise be imposed on the structure of the shoe at the point where the same has been in practice found to be the weakest.

Claims.

1. A vehicle tire shoe comprising a body portion embodying a plurality of superposed strips of rubber coated fabric, said strips each having a series of cords solidly juxtaposed in parallel relation, and a relatively weak binding material holding said cords in said relation, said strips being arranged to place the cords therein in angular relation to the axis of said shoe; a non-extensible strip incorporated in said body portion and between the layers of said strips adjacent the inner edges of said shoe for resisting the torque strain imposed on said shoe when in service; and a restraining ring for preventing the expansion of said shoe, said ring embodying a plurality of convolutions of wire closely grouped to form a metal ring, and a fabric cover therefor, said cover having an extending fringe adapted for inter-position between the layers of strips forming said body portion for distributing the strain of said rings over an increased area of said body portion.

2. A vehicle tire shoe comprising a body portion embodying a plurality of superposed strips of fabric, said strips each having a series of cords solidly juxtaposed in parallel relation; and a relatively weak binding material holding said cords in said relation, said strips being arranged to place the cords therein in angular relation to the axis of said shoe; a non-extensible strip incorporated in said body portion and between the layers of said strips adjacent the inner edges of said shoe for resisting the torque strain imposed on said shoe when in service; a restraining ring for preventing the expansion of said shoe, said ring embodying a plurality of convolutions of wire closely grouped to form a metal ring, and a fabric cover therefor, said cover having an extending fringe adapted for inter-position between the layers of strips forming said body portion for distributing the strain of said rings over an increased area of said body portion; and a plurality of molded bead fillers juxtaposed to, and forming a cushion for said rings.

FREDERICK A. SCHULTZ.